United States Patent
Hundal et al.

(10) Patent No.: US 7,395,061 B2
(45) Date of Patent: *Jul. 1, 2008

(54) SYSTEM AND METHOD FOR AVOIDING INTERFERENCE AMONG MULTIPLE WIRELESS SYSTEMS

(75) Inventors: Sukhdeep S. Hundal, British Columbia (CA); Milosh Koprivica, British Columbia (CA)

(73) Assignee: VTech Telecommunications Limited, Tai Po, New Territory, Hong Kong (HK)

( * ) Notice: Subject to any disclaimer, the term of this patent is extended or adjusted under 35 U.S.C. 154(b) by 521 days.

This patent is subject to a terminal disclaimer.

(21) Appl. No.: 10/429,760

(22) Filed: May 6, 2003

(65) Prior Publication Data

US 2004/0224650 A1 Nov. 11, 2004

(51) Int. Cl.
*H04Q 7/20* (2006.01)
(52) U.S. Cl. .................. 455/426.1; 455/569.1; 455/41.2
(58) Field of Classification Search ............ 455/41.1–3, 455/569.1, 557, 347, 348, 349, 350, 351, 455/426.1, 464, 553.1; 379/428.02, 420.04, 379/430
See application file for complete search history.

(56) References Cited

U.S. PATENT DOCUMENTS

| | | | |
|---|---|---|---|
| 5,625,888 A | 4/1997 | Rüther et al. | |
| 5,627,823 A | 5/1997 | Pillekamp | |
| 5,913,163 A * | 6/1999 | Johansson | 455/426.1 |
| 6,223,029 B1 * | 4/2001 | Stenman et al. | 455/420 |
| 6,731,939 B1 * | 5/2004 | Watanabe et al. | 455/450 |
| 6,760,317 B1 * | 7/2004 | Honkanen et al. | 370/329 |
| 6,895,255 B1 * | 5/2005 | Bridgelall | 455/552.1 |
| 6,909,909 B2 * | 6/2005 | Izumi | 455/557 |
| 6,922,551 B1 * | 7/2005 | Bristow et al. | 455/103 |
| 6,925,073 B2 * | 8/2005 | Siemens et al. | 370/337 |
| 2002/0085520 A1 * | 7/2002 | Sydon et al. | 370/335 |

FOREIGN PATENT DOCUMENTS

| | | |
|---|---|---|
| GB | 2255476 | 11/1992 |
| GB | 2260879 | 4/1993 |
| WO | WO 98/44667 | 10/1998 |

OTHER PUBLICATIONS

IEEE, ANSI/IEEE Std 802.11, 1999, IEEE, p. 128, Section 11.1.5.*
GB Search Report.

* cited by examiner

*Primary Examiner*—Edward F. Urban
*Assistant Examiner*—Christian A. Hannon
(74) *Attorney, Agent, or Firm*—Paul Hastings Janofsky & Walker, LLP (57) ABSTRACT

A system and method for avoiding interference between two communications system is disclosed. A preferred embodiment of the invention provides a method that obtains frequency information associated with a first RF link between a handset of a cordless telephone and a headset. Using the frequency information, the method then generates an RF channel for a second RF link between the handset and a base unit of the cordless telephone. The RF channel is different from one or more RF channels associated with the first RF link. Preferably, the headset is a Bluetooth headset. Preferably, the first RF link is a Bluetooth RF link. Preferably, the second RF link is a WDCT RF link.

22 Claims, 11 Drawing Sheets

**FIGURE 1
KNOWN ART**

**FIGURE 2
KNOWN ART**

**FIGURE 3
KNOWN ART**

**FIGURE 4
KNOWN ART**

FIGURE 5
KNOWN ART

FIGURE 6
KNOWN ART

**FIGURE 7
KNOWN ART**

**FIGURE 8
KNOWN ART**

FIGURE 9
KNOWN ART

FIGURE 10
KNOWN ART

SYSTEM AND METHOD FOR AVOIDING INTERFERENCE AMONG MULTIPLE WIRELESS SYSTEMS

BACKGROUND

1. Field of the Invention

The present invention relates generally to cordless telephony and, more particularly, to a method for avoiding interference among multiple communications systems.

2. Background of the Invention

The ISM (Industrial Scientific Medical) band includes 902-928 MHz, 2.4-2.483 GHz, and 5.725-5.875 GHz frequency ranges. In the United States, the ISM band is unlicensed, which means that any of the ISM band frequency ranges can be used in a variety of applications as long as Federal (FCC) Communications Commission's part 15 rules are followed. One such application involve cordless telephones, which operates in each of the 900 MHz, 2.4 GHz, and 5.8 GHz ranges. Another application of the ISM band involves Bluetooth (BT) wireless technology, which uses the 2.4 GHz range frequencies.

BT technology is used by in cellular telephones to enable communications between a cordless headset (e.g., one that can be worn on a user's head to enable "hands-free" operations) and a cellular telephone (e.g., one that can be attached to the user's belt). In such application, a BT transceiver is housed within each of the cordless headset and the cellular telephone. Since the BT transceivers and the cellular telephone network operate at different frequency bands, no significant interference is experienced.

Similar utility of BT technology has not been made in cordless telephones. This is because incorporation of BT technology in the cordless telephone sector would likely cause an unacceptable interference in the 2.4 GHz ISM band. For example, in a situation in which a BT transceiver is located in a cordless handset that already has a conventional 2.4 GHz cordless telephone transceiver, significant interference can be expected. Due to the significant interference, an acceptable communications session between a BT headset and the cordless handset may not be achievable. Currently, there is no known solution that would enable a cordless telephone to communicate with a BT headset.

Figure 1:
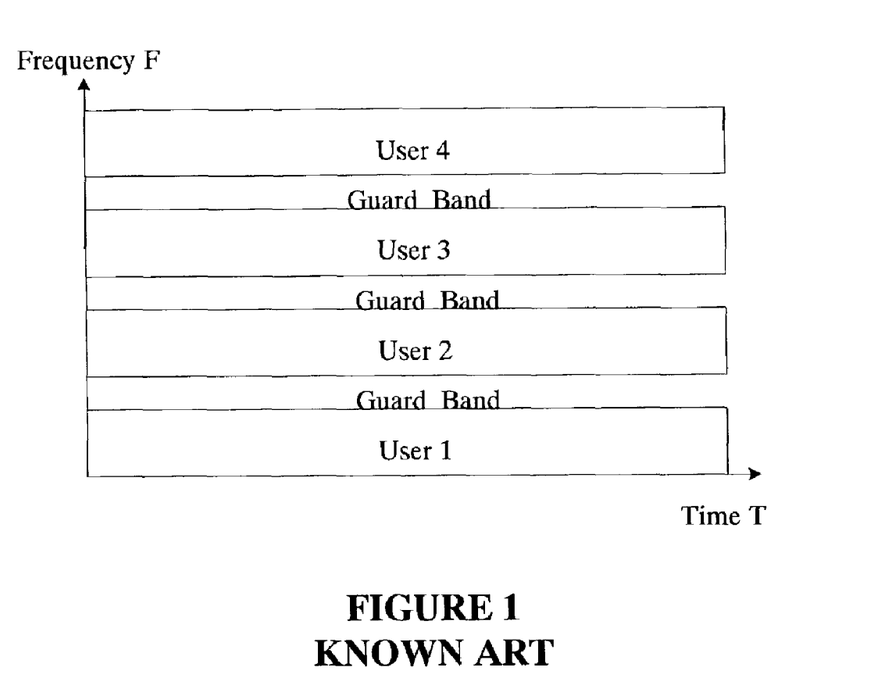
FIG. 1 is a schematic diagram showing the known method of Frequency Division Multiple Access (FDMA).

Multiple access systems are well known in art. Signals that occupy non-overlapping frequency bands can be easily separated using appropriate band pass filters. Therefore, signals from two transceivers can be simultaneously transmitted without interfering each other as presented on FIG. 1. In this method, multiple access capabilities is achieved in frequency domain and the method is called Frequency Division Multiple Access (FDMA).

Figure 2:
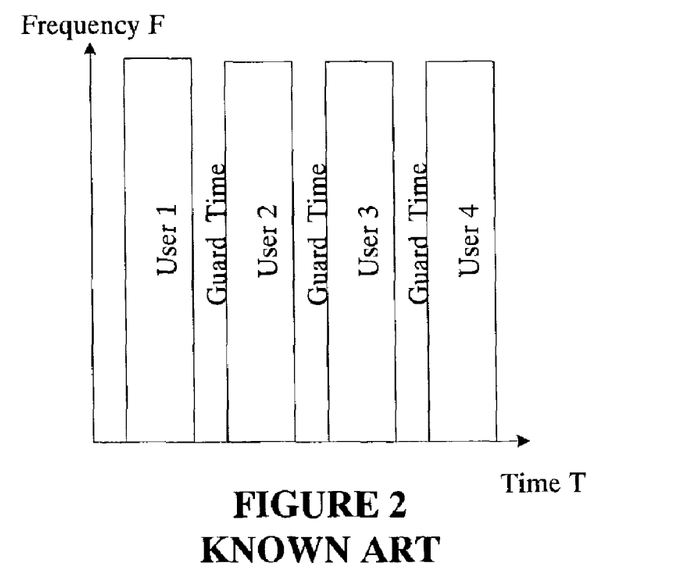
FIG. 2 is a schematic diagram showing the known method of Time Division Multiple Access (TDMA).

Similarly, instead on using different frequencies that are assigned to different users, signals can be transmitted at different time slots in a round-robin fashion, as shown on FIG. 2. Signals from two transceivers occupy the same frequency band but they are separated based on time of arrival. Multiple access is achieved in time domain and the method is called Time Division Multiple Access (TDMA).

Figure 3:
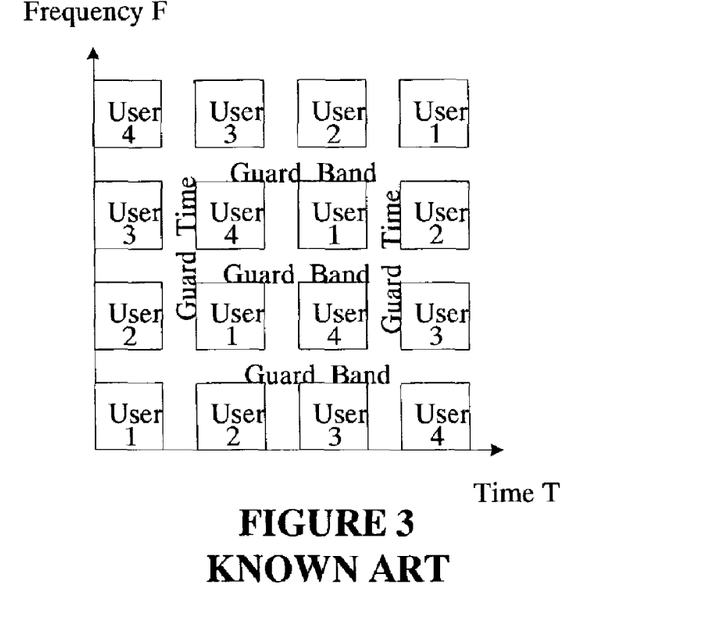
FIG. 3 is a schematic diagram showing the known method of Code Division Multiple Access (CDMA).

One commonly used access method, shown in FIG. 3, is a combination of the previous two methods, which is known as Code Division Multiple Access (CDMA). Using the known Frequency Hopping (FH) CDMA, different users non-overlap in time and frequency domain to avoid interference.

Figure 4:
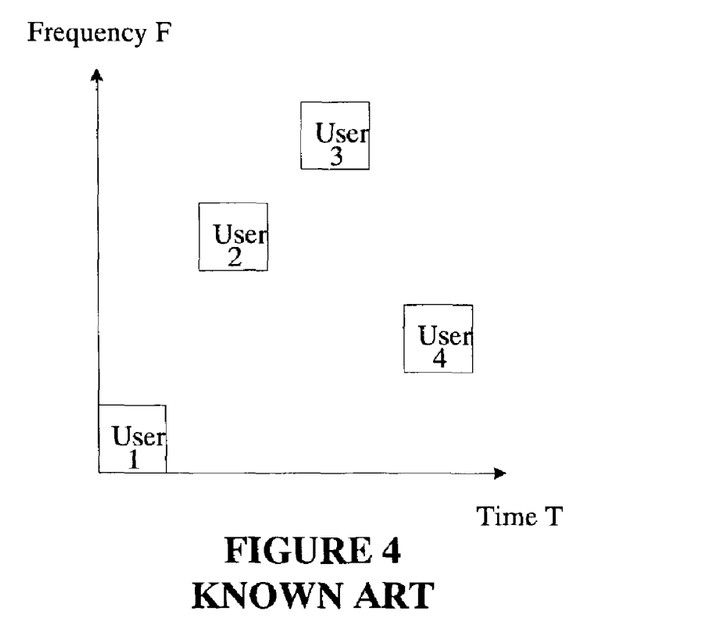
FIG. 4 is a schematic diagram showing the known method of Frequency Hopping Time Division Multiple Access (FH-TDMA).

Similar to FH-CDMA is the FH-TDMA access method that is shown in FIG. 4. System based on this access method has a smaller capacity than a FH-CDMA but it can be built in a more cost effective way by using a less complex transceiver at one link end. Example of such a FH-TDMA system can be found in current VTech 2.4 GHz and 5.8 GHz cordless telephones, which are based on World Digital Cordless Telephone (WDCT) standard. The WDCT standard was originally developed by Siemens, AG. The WDCT standard is a modification of Digital European Cordless Telephone (DECT) standard derived by adding frequency hopping in DECT TDMA based access. The WDCT standard is commonly used for cordless telephones in North America.

Figure 5:
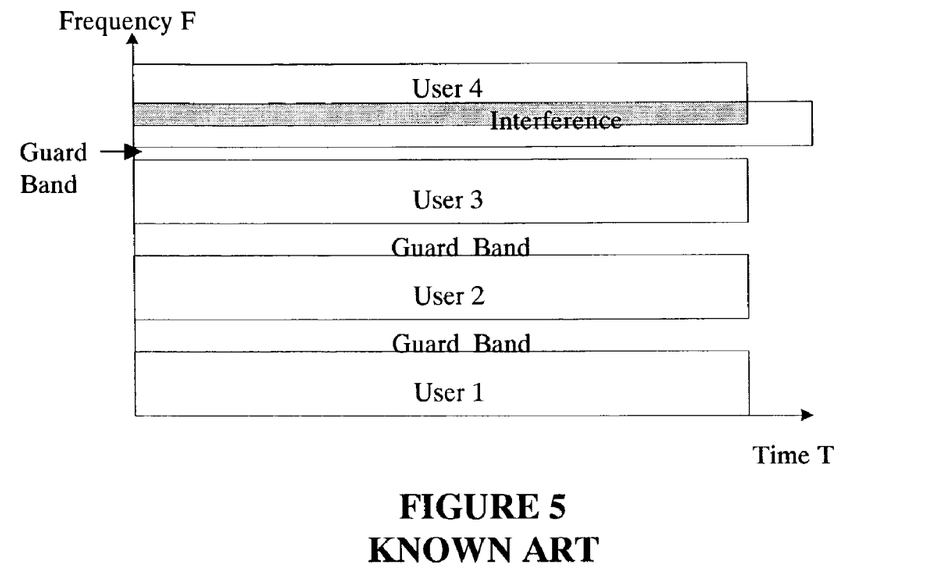
FIG. 5 is a schematic diagram showing a known method called Dynamic Channel Assignment (DCA) or Dynamic Channel Replacement (DCR) that is used in a FDMA system.
Figure 6:
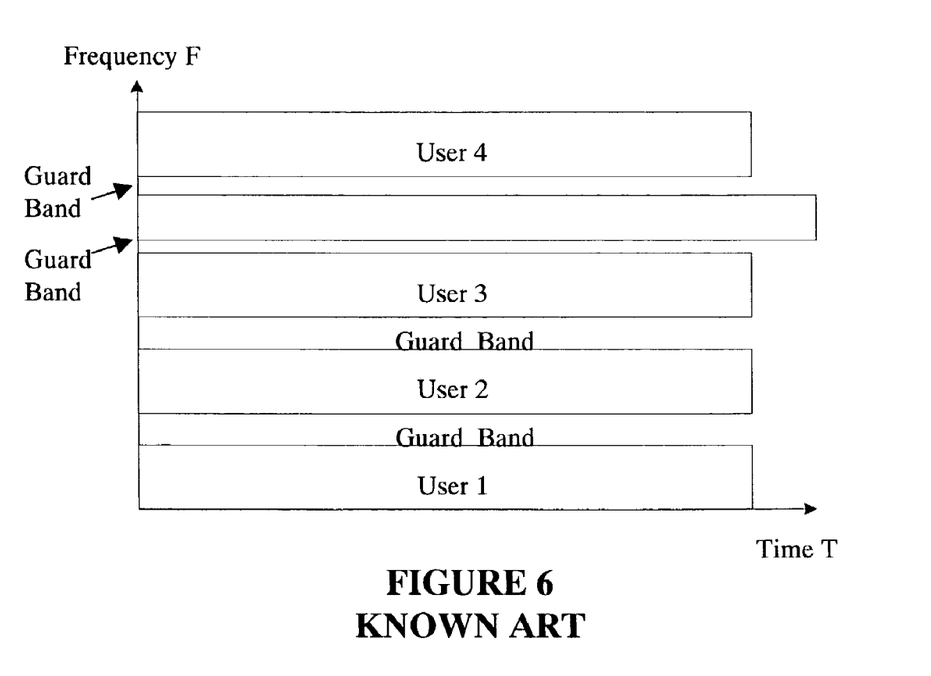
FIG. 6 is a schematic diagram showing how the system of FIG. 5 chooses a new replacement frequency RF channel to avoid narrow band transmission.

To avoid interference from other systems which have relatively narrow band transmissions, e.g., see FIG. 5, FDMA systems are utilizing a known method called Dynamic Channel Assignment (DCA) or Dynamic Channel Replacement (DCR). The idea is based upon detecting a presence of interference by measuring Receive Signal Strength Indication (RSSI), frame synchronization, and/or packet/bit loss errors. If RSSI, number of frame synchronization, and/or packet/bit loss errors are more than specified values, new replacement frequency RF channel are chosen by both link parties (See FIG. 6) to avoid narrow band transmission.

Figure 7:
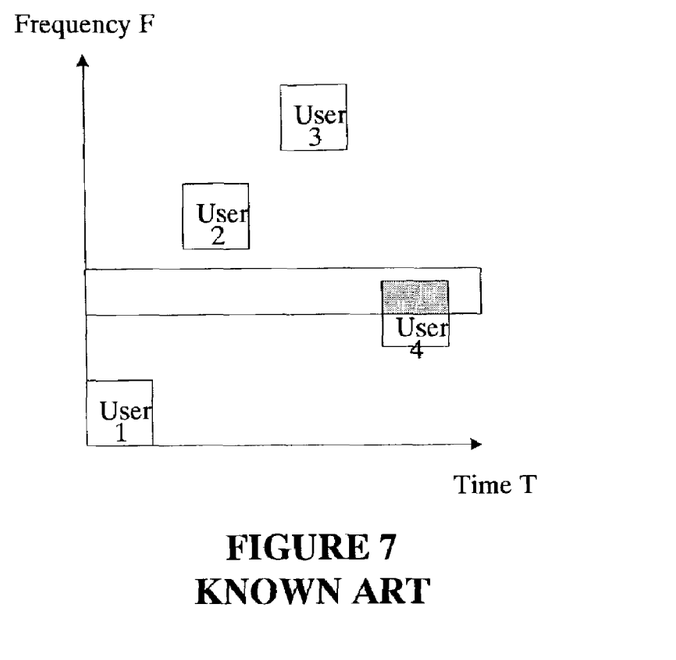
FIGS. 7 and 8 show that the approach shown in FIGS. 5 and 6 can be used for FH-TDMA based systems.
Figure 8:
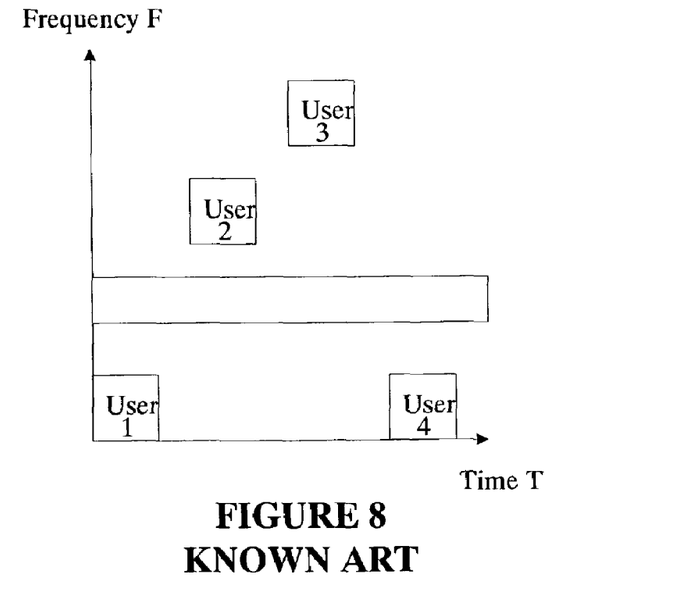

Effectively, same approach can be used for FH-TDMA based systems shown in FIG. 7 and FIG. 8. One specific implementation of this approach is disclosed in U.S. patent application Ser. No. 09/566,371, filed May 8, 2000, which is incorporated herein by reference in their entirety.

Figure 9:
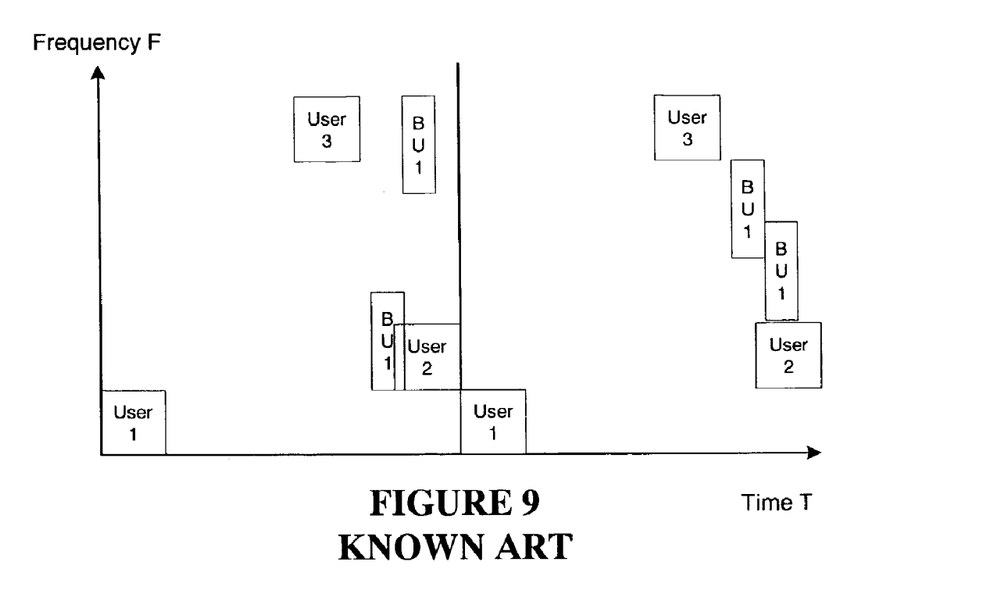
FIG. 9 is a schematic diagram showing operation of two different FH-TDMA systems in the same band and in close proximity.

In the case of operation of two different FH-TDMA systems in the same band and in close proximity as shown in FIG. 9, generated interference is generally much harder to be avoided. The first problem is that the interfering FH-TDMA system tries to use the same whole-allocated band of the existing FH-TDMA system, therefore limiting the number of RF channels that are free of interference or that are ready to be used as replacement RF channels. The second problem is that the interfering FH-TDMA system transmits short period of time pseudo randomly on a given RF channel. Because of the presence of the interfering FH-TDMA system on a given RF channel is harder to detect, thresholds in terms of required RSSI levels, number of lost synchronization and/or packet/bit errors is harder to be saturated. After one period of time with interference will follow several periods without interference on a given RF channel.

Figure 10:
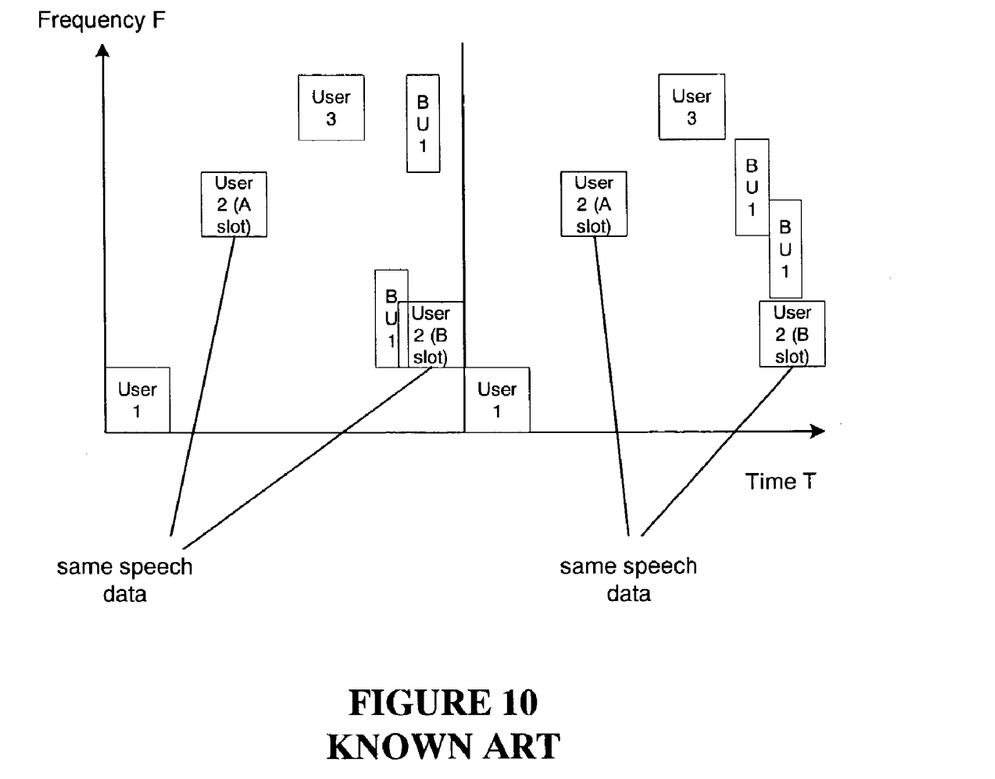
FIG. 10 is a schematic diagram showing an enhanced mode that is used to transmit essentially same speech data from one user connection twice over two different RF channels at two different times.

One way of addressing this issue is to include the commercially known enhanced mode as implemented in some existing 2.4 GHz and 5.8 GHz systems. In the enhanced mode, essentially same speech data from one user connection is transmitted twice over two different RF channels at two different times. This is schematically shown in FIG. 10. The negative side of this method is that the capacity of the system in terms of number of users that can simultaneously use the system is reduced in the presence of FH-TDMA type of interfere.

SUMMARY OF THE INVENTION

In one aspect, the invention provides a system that includes a fixed unit having a fixed transceiver, a portable unit having a portable transceiver, and an additional transceiver coupled to one of the fixed unit and the portable unit. The fixed transceiver and the portable transceiver are configured to communicate with each other via a first RF link. The additional transceiver is configured to communicate with a headset via a second RF link. The system further includes a processor coupled to one or more of the fixed transceiver, the portable transceiver, and the additional transceiver. The processor is configured to avoid interference between the first RF link and the second RF link by generating an RF channel for the first RF link. The RF channel for the first RF link is different from one or more RF channels associated with the second RF link.

Preferably, the fixed unit is configured to communicate with a telephone network and the fixed unit and the portable unit are a base unit and a cordless handset of a cordless telephone, respectively. Preferably, each of the fixed transceiver and the portable transceiver is a cordless telephone transceiver. Preferably, the cordless telephone transceiver is a WDCT transceiver. Preferably, the headset is a BT headset and the additional transceiver is a BT transceiver.

Preferably, the processor generates the RF channels based on frequency information associated with the second RF link. Preferably, the frequency information includes BT clock information and BT connection address information. Preferably, the frequency information is provided to the processor via a control data connection.

In another embodiment, the invention provides a handset of a cordless telephone that includes a first portable transceiver, a first processor, and a second portable transceiver. The first portable transceiver is configured to communicate with a fixed transceiver of a fixed unit of the cordless telephone via a first RF link. The first processor is coupled to the first portable transceiver and the second portable transceiver. The second portable transceiver is configured to communicate with a headset transceiver of a headset via a second RF link. The first RF link and the second RF link are associated with two different RF systems. The first processor is configured to receive frequency information associated with the second RF link to generate an RF channel for the first RF link that does not interfere with one or more RF channels of the second RF link.

Preferably, the handset further includes a second processor coupled to the second portable transceiver. The second processor is configured to supply the frequency information to the first processor using a control data connection between the second processor and the first processor. Preferably, the frequency information includes BT clock and BT connection address.

In another aspect, the invention provides a method that obtains frequency information associated with a first RF link between a handset of a cordless telephone and a headset. Using the frequency information, the method then generates an RF channel for a second RF link between the handset and a base unit of the cordless telephone. The RF channel is different from one or more RF channels associated with the first RF link. Preferably, the headset is a BT headset. Preferably, the first RF link is a BT RF link. Preferably, the second RF link is a WDCT RF link.

A preferred embodiment of the invention provides a method that includes the following process. First, a voice link is established between a handset of cordless telephone and a BT headset. Second, a BT clock is incremented once for each BT slot by a BT processor to generate BT clock information. Third, the BT clock information is sent by the BT processor to a cordless processor. Fourth, an RF channel is generated as a function of the BT clock information. Fifth, the RF channel is used to facilitate an RF link between the handset and a base unit of the cordless telephone.

Preferably, the method further includes one or more additional steps. Sixth, a voice link address information is assigned by the BT processor for the duration of the voice link. Seventh, the voice link address information is sent by the BT processor to the cordless processor of the cordless telephone. Eighth, the voice link address information is used to generate the RF channel.

The BT processor can be located in one or both of the BT headset and the handset. The cordless processor is located in one or both of the base unit and the handset. Preferably, the BT processor and the cordless processor are both located in one of the base unit and the handset. Preferably, the voice link address and the BT clock information are provided by the BT processor to the cordless process via a control data connection.

DETAILED DESCRIPTION OF THE INVENTION

The present invention relates to avoidance of mutual interference between two communications systems. To help explain the invention, this disclosure describes how an interference between a first RF link (e.g., a cordless transmission in general and a WDCT transmission in particular) and a second RF link (e.g., a BT RF transmission) can be avoided. This invention is not limited to WDCT or BT. To the contrary, the invention can be adapted for implementation in systems that use technologies other than the described WDCT and BT systems.

As discussed above, incorporation of BT technology in a cordless telephone that operates in the 2.4 GHz ISM band will likely cause an interference between the BT link and the cordless link. The interference is due to the close proximity of the BT and cordless links.

One embodiment of the present invention solves the aforementioned interference problem by adjusting the transmit/receive frequency of the 2.4 GHz cordless link so that the cordless link and BT link do not transmit/receive in the same frequency. The cordless link can use, e.g., the WDCT standard, which was originally developed by Siemens, AG. The WDCT standard is a modification of Digital European Cordless Telephone DECT standard derived by adding frequency hopping in DECT TDMA based access. WDCT is commonly used for cordless telephones in North America.

Figure 11:
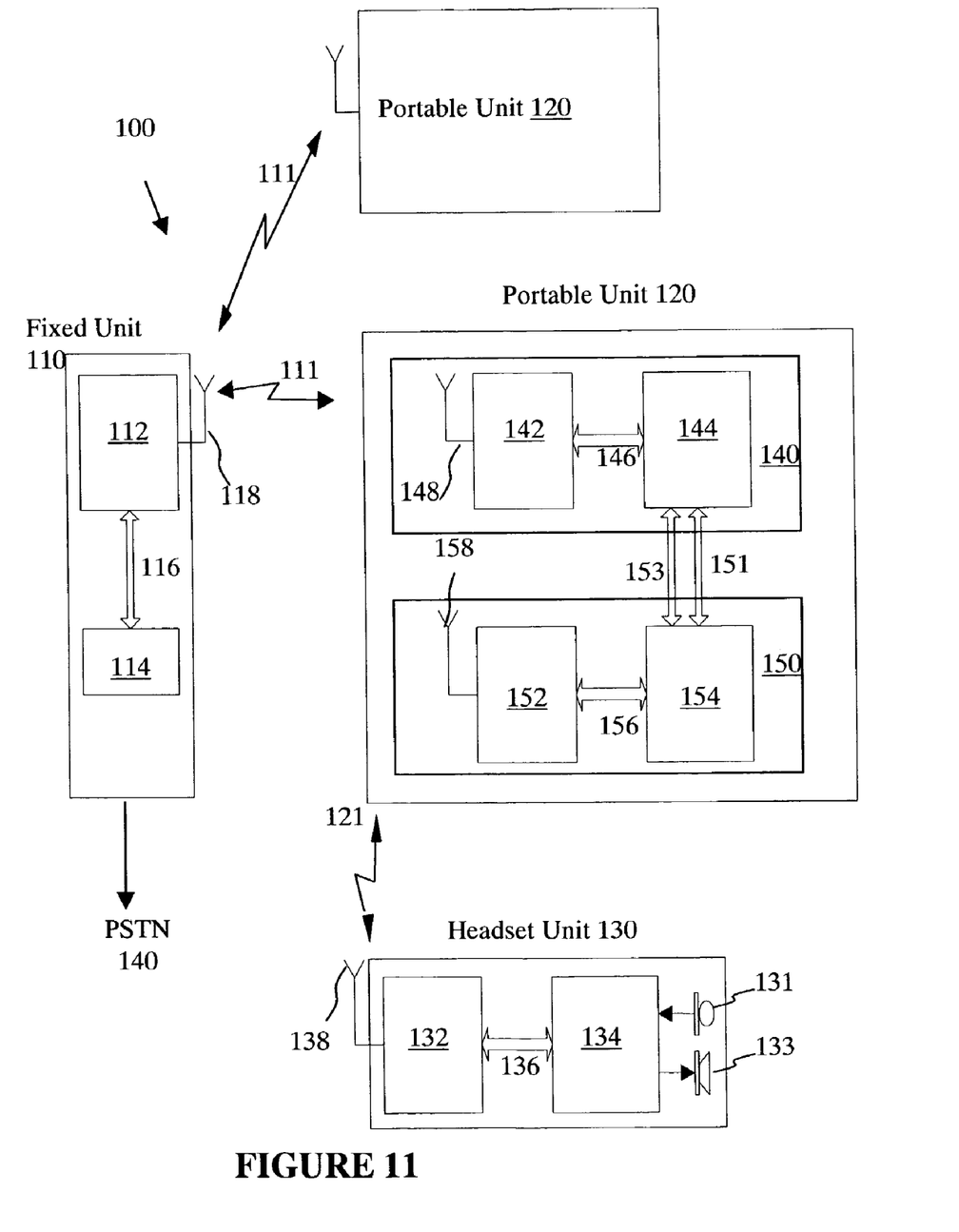
FIG. 11 is a schematic diagram showing an exemplary layout of an embodiment of the invention.

FIG. 11 is a schematic diagram showing various components of an embodiment of the invention. System 100 includes fixed unit 110 and one or more portable units 120. Although two portable units 120 are shown in FIG. 11, system 100 can include only one portable unit 120 or more than two portable units 120. In addition, there can be two types of portable units present at the same time in the system. For example, the first type of portable unit 120 can be a BT-enabled unit and the second type can be a regular handset unit that is not BT enabled. In a specific implementation of the invention in which system 100 is a cordless telephone, portable units 120 are the handsets of the cordless telephone and fixed unit 110 is the base unit of the cordless telephone.

System 100 is configured to communicate with headset unit 130. Fixed unit 110 communicates with portable unit 120 via first link 111, and portable unit 120 communicates with headset unit 130 via second link 121. First link 111 uses a cordless RF link. For example, the known WDCT standard may be utilized to support first link 111. Second link 121 uses an RF link that is different from first link 111. For example, second link 121 may use the known BT technology. It is noted that the present invention is not limited to either the WDCT standard or the BT technology.

Fixed unit 110 is configured to communicate with PSTN 140. Fixed unit 110 includes fixed transceiver 112 and fixed processor 114. Fixed processor 114 is configured to process signals associated with fixed transceiver 112. Fixed transceiver 112 and fixed processor 114 communicate with each other via interface 116. Fixed transceiver 112 is configured to communicate with portable unit 120 via antenna 118. Preferably, fixed transceiver 112 is a known cordless transceiver (e.g., WDCT transceiver) and fixed processor 114 is a known processor (e.g., WDCT processor). Fixed transceiver 112 and fixed processor 114 are members of a fixed RF system (e.g., WDCT system).

Portable unit 120 includes first portable RF system 140 and second portable RF system 150. First portable RF system 140 includes first portable transceiver 142 and first portable processor 144. First portable processor 144 is configured to process signals associated with first portable transceiver 142. First portable transceiver 142 and first portable processor 144 communicate with each other via interface 146. Preferably, first portable RF system 140 is a known cordless RF system and interface 146 is a known RF interface. First portable transceiver 142 is configured to communicate with fixed unit 110 via antenna 148. Antenna 148 communicates with antenna 118 via first link 111. Preferably, first link 111 is a cordless telephone RF link.

Second portable RF system 150 includes second portable transceiver 152 and second portable processor 154. Second portable processor 154 is configured to process signals associated with second portable transceiver 152. Second portable transceiver 152 and second processor 154 communicate with each other via interface 156. Preferably, second portable RF system 150 is a BT system. Second portable transceiver 152 is configured to communicate with headset unit 130 via antenna 158. First portable processor 144 and second portable processor 154 communicate with each other. For example, audio interface 151 facilitates exchange of audio information between second portable processor 154 and first portable processor 144. In addition, non-RF related signaling 153 can be exchanged between second portable processor 154 and first portable processor 144. Non-RF related signaling 153 can include, for example, provision of control data.

Headset 130 includes headset transceiver 132 and headset processor 134. Headset processor 134 is configured to process signals associated with headset transceiver 132. Headset transceiver 132 and headset processor 134 communicate with each other via interface 136. Headset processor 134 is in communication with microphone 131 and speaker 133. Headset transceiver 132 is configured to communicate with portable unit 120 via antenna 138. Antenna 138 communicates with antenna 158 via second link 121. Preferably, headset transceiver 132 is a BT transceiver and second link 121 is a BT RF link. Headset transceiver 132 and headset processor 134 are members of a headset RF system (e.g., BT system).

In an alternative embodiment, second portable RF system 150 can be embedded within fixed unit 110 for a direct connection from fixed unit 110 to headset unit 130. Note that all the interference issues remain same whether second portable RF system 150 is embedded in portable unit 120 or fixed unit 110.

In practice, a user of telephone system 100 wears headset unit 130 on his head so that microphone 131 can receive his voice and speaker 133 can deliver sound to his ear. Portable unit 120 can be clipped to his belt or placed in a pocket. Fixed unit 110 is stationed in a building with access to PSTN 140. In this manner, so long as portable unit 120 is within the range of fixed unit 110, communication between fixed unit 110 and portable unit 120 can be facilitated via first link 111. Similarly, headset unit 130 and portable unit, both of which are with the user, can communicate with each other via second link 121. Preferably, fixed unit 110 can support more than one portable unit 120.

In a preferred embodiment of the invention, fixed transceiver 112 and first portable transceiver 142 are cordless telephone transceivers (e.g., WDCT transceivers) and second portable transceiver 152 and headset transceiver 132 are BT transceivers. Fixed transceiver 112 and first portable transceiver 142 communicate with each other via cordless telephone RF link 111. Second portable transceivers 152 and headset transceiver 132 communicate with each other via BT RF link 121. In a situation in which each of fixed transceiver 112, first portable transceiver 142, second portable transceiver 152, and headset transceiver 132 is operating in the 2.4 GHz frequency range, one aspect of the invention is to multiplex frequencies of second portable transceiver 152 and first portable transceiver 142 to avoid mutual interference.

One aspect of the invention is to adjust the transmission/receive frequency of first portable RF system 140 to avoid mutual interference with second portable RF system 150 (e.g., a BT transceiver). In an implementation in which first portable RF system 140 is a WDCT FH-TDMA transceiver and second portable RF system 150 is a BT transceiver, the invention allows BT and WDCT 2.4 GHz transceivers to co-exist in portable unit 120 in which WDCT air interface can be used for RF link from portable unit 120 to fixed unit 110 and BT link can be used from portable unit 120 to BT headset unit 130.

Accordingly, various embodiments of the invention can be configured to, among other objectives:

(a) improve voice quality in cordless telephone sets when two transceivers (e.g., first portable RF system 140 and second transceiver 150) are placed in close proximity to each other, preferably in the same housing and the third transceiver (e.g., the fixed transceiver located in fixed unit 110) is further away in active link with one of first two transceivers (e.g., first portable RF system 140); and (b) decrease interference generated from first and/or third transceivers (e.g., the fixed transceiver and/or first portable RF system 140) to the second transceiver (e.g., second portable RF system 150).

Inventors of the invention have conducted experiments related to how long it might take to generate one BT RF channel if address and clock information from BT transceiver is available. Code was written in C and assembly language, and the code was embedded in a single line WDCT FH-TDMA product for the purpose of evaluating whether it was possible to calculate BT-based channels in real time. Several optimization iterations were done. It was concluded that it takes down to about 50 μs (micro seconds) to generate one BT channel. Results of this experiment indicate that it is possible to embed a BT transceiver in a WDCT handset and to dynamically generate channels that are required to be avoided in real-time.

Accordingly, advantages of the invention include:

Use of 3.2 KHz BT system clock for time synchronization allows for very effective implementation in processing power required, complexity of implementation, and cost;

Use of existing frame structure/format of WDCT, leading to low development risk and faster time to market; and Time synchronization means that 2.4 GHz WDCT and BT transceiver can co-exist in a close proximity without causing front end overloading of the BT transceiver.

Figure 12:
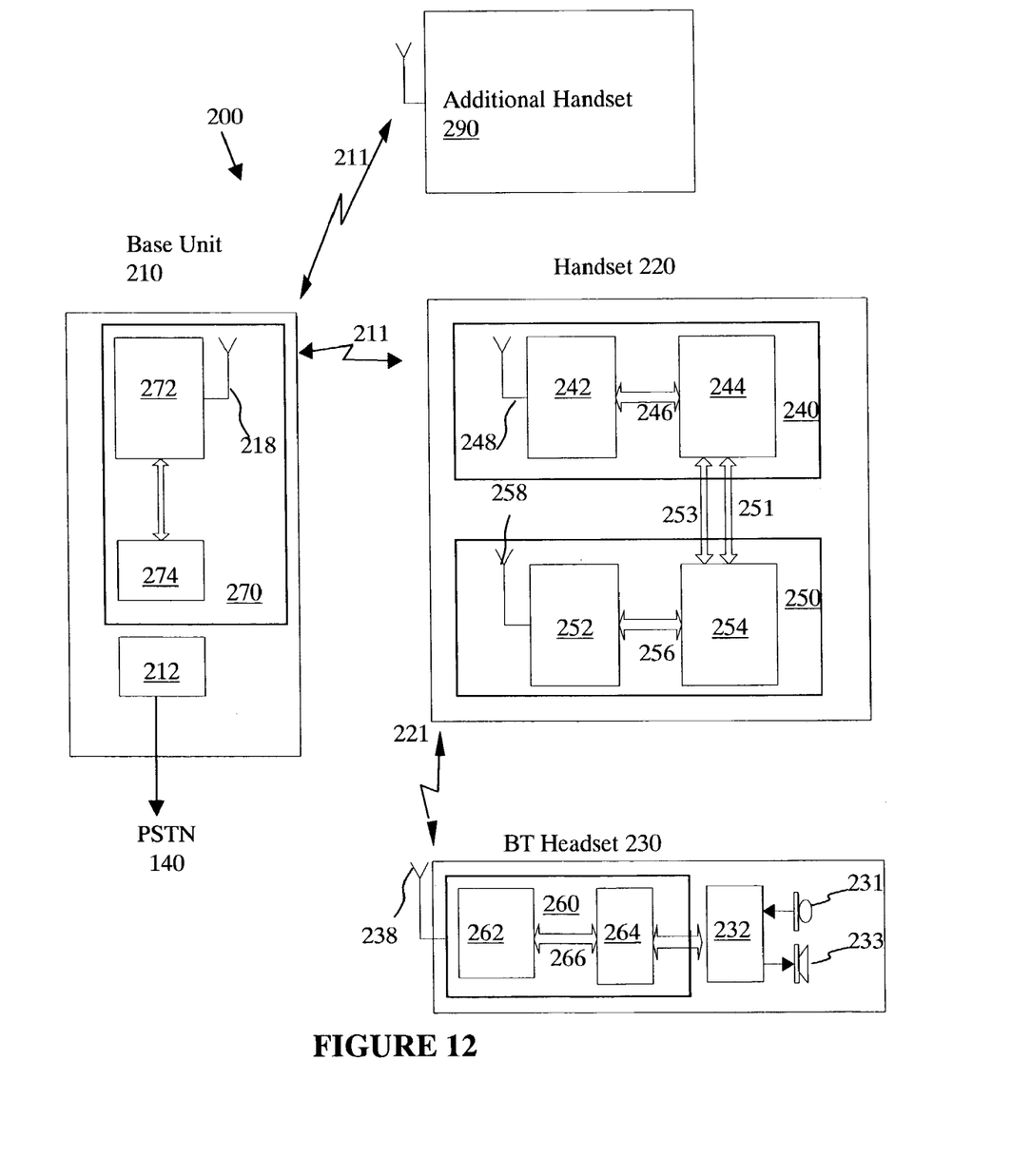
FIG. 12 is a schematic diagram showing an exemplary layout of a preferred embodiment of the invention.

FIG. 12 is a schematic diagram showing a preferred embodiment of the invention in the context of a cordless telephone multi-handset FH-TDMA WDCT system. Cordless telephone 200 is a cordless telephone multi-handset FH-TDMA WDCT system that includes base unit 210 handset 220. Base unit 210 and handset 220 communicate with each other using WDCT link 211 between WDCT system 270 of base unit 210 and WDCT system 240 of handset 220. Handset 220 is configured to communicate with BT headset 230 using BT RF link 221 between BT system 250 in handset 220 and BT system 260 in BT headset 230. WDCT systems 270 and 240 are based on the known WDCT standard. BT systems 250 and 260 are based on the known BT wireless standard.

WDCT system 240 is used for the WDCT 2.4 GHz link 211 between base unit 210 and handset 220. BT system 250 is used as the interfere for the second 2.4 GHz link 221 between handset 220 and BT headset 230. Preferably, each of RF systems 240, 250, 260, and 270 includes a transceiver (transceivers 242, 252, 262, 272, respectively) and a processor (processors 244, 254, 264, 274, respectively). Processors 244, 254, 264, 274 run known communications protocol.

Base unit 210 includes analog front end (AFE) 212. AFE 212 routes voice to PSTN 140. BT headset 230 includes AFE 232, which serves as an interface between processor 264 from microphone 231 and from processor 264 to speaker 233. Handset 290 or another handset that is capable to communicate with base unit 210 may or may not include capability to link with BT headset 230.

Between WDCT system 240 and BT system 250 in handset 220, there are two communications channels. First channel 251 is used for transferring voice between transceivers 240 and 250. Physical media of second channel 253 can be wireless or wired, but it is preferred to be wired. Over second channel 253, WDCT processor 244 in handset 220 is supplied with information associated with BT system 250. The information can include, for example, estimated future transmission frequency of BT system 250. Preferably, BT system 250 may be modified to send information that may include 28 bit wide BT clock (BT CLOCK) and 28 bit wide BT connection address (ADDR) UAP/LAP to the WDCT processor 244 in handset 240. Handset 220 supplies base unit 210 with that information by using WDCT link 211.

After that on both WDCT link sides base unit 210 and handset 220 independently derive next two BT RF channels based on essentially an RF channel BT selection algorithm that is further described below. Two BT channels are derived because of the fact that BT frequency hopping is higher than WDCT, basically giving a possibility that in one WDCT FH-TDMA slot transmission there are two BT FH-TDMA transmissions. As a result, WDCT system 240 in handset 220 needs to avoid two BT RF channels in one WDCT TDMA slot.

Based on the two future derived BT RF channels that will be used in next BT transceiver transmission, WDCT processor 274 in base unit 210 and WDCT processor 244 in handset 220 derive non-interfering RF channel that can be used for next hop, i.e., the next WDCT transmit-receive. The formula by which this new RF channel is derived is the same between base unit 210 and handset 220. There are different methods or formulas by which the non-interfering RF channels can be derived. For example, the centre frequency of the new WDCT RF channel can be one which is on the opposite side of the band comparing to the centre frequency in between of BT RF channel one and BT RF channel two. In practice, the invention can utilize any known possibilities regarding how new WDCT RF channels can be derived. What is important is that any new WDCT RF channel shall not interfere with any of two BT RF channels that will be used, and that same WDCT RF channel will be used in base unit 210 and handset 220 so that base unit 210 and handset 220 can be in communication while avoiding interfering with BT headset 230.

Figure 13:
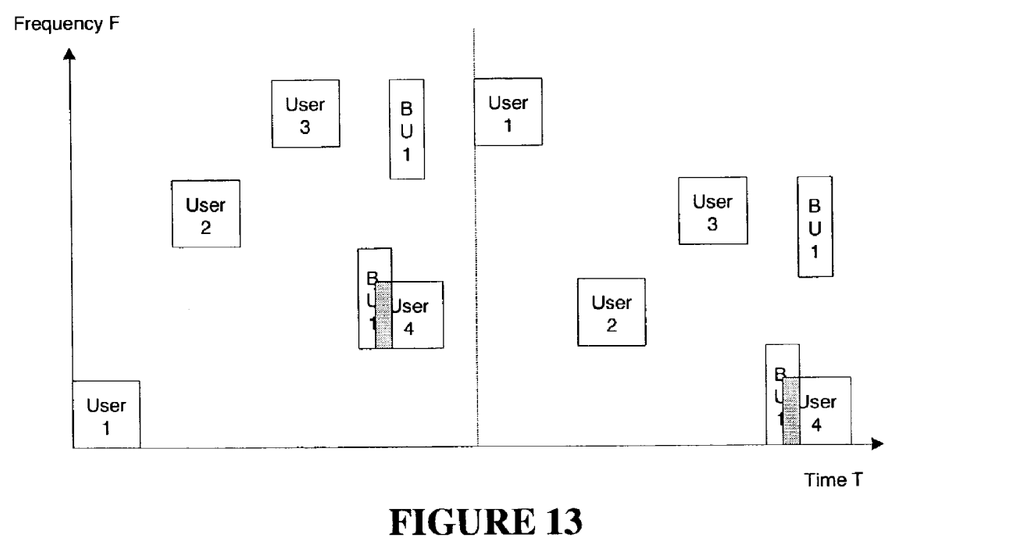
FIG. 13 is a schematic diagram showing frequency collisions between WDCT FH-TDMA and BT FH-TDMA systems.
Figure 14:
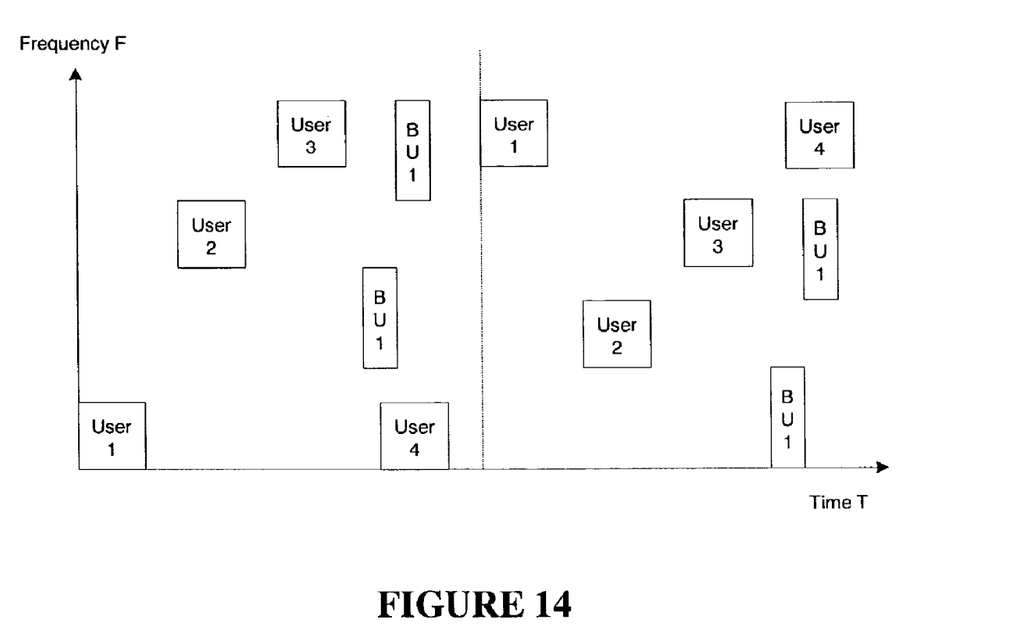
FIG. 14 is a schematic diagram showing frequency avoidance in a preferred embodiment of the invention.

As shown in FIG. 13, before WDCT systems 240 and 270 start to do frequency avoidance there are collisions between WDCT FH-TDMA and BT FH-TDMA systems. After WDCT systems 240 and 270 are informed about the next BT RF channel that will be used, the WDCT systems avoid RF channels that are in use by BT link portion. This access method is schematically represented in FIG. 14. It is important to notice that in the preferred embodiment of the invention, utilization of RF channels in BT link 221 does not change. This allows utilization of standard BT headsets without any modification while preserving high voice quality without interference with handset WDCT system 240.

The provision of frequency information (e.g., BT clock and BT address) to WDCT systems can be done wirelessly. For convenience, BT clock and BT address are collectively referred to as BT information hereinafter. The BT information can then be used to generate or derive non-interfering channels for the WDCT systems. To that end, the WDCT systems synchronize with the BT system by listening one RF channel over which the BT system broadcasts the BT information (e.g., BT address and BT clock). Because the address changes each time when a connection is established, this method is not practical but is possible. Therefore, it may take a long time for the WDCT transceiver to get the BT information wirelessly. Another disadvantage is that the WDCT systems must be utilized to receive signals of the higher BT bit rate. Accordingly, it would be preferable to supply the BT information in a wired fashion over control data connection 253.

If the interfering FH-TDMA system is using just a portion of the regulated band, then it is possible to be avoided by identifying used band and avoidance of use RF channels that belongs to this band.

The preferred embodiment of the invention provides the following advantages and novel features:

1. Having another FH-TDMA interfering system present does not reduce system capacity in terms of number of simultaneous users.

2. Interference predictions are used to avoid RF channels that are in use by interfering FH-TDMA system at specific time slots.

3. Means for using synchronization error and/or packet/bit loss information and known RF channels distribution by interfere FH-TDMA systems to derive RF channel to be used.

4. Means for wired or wireless communicating of information between interfering and main system to derived RF channel to be used.

5. Means for applying formula that will take as an input information about interfere RF channel in use and/or system clock and/or connection address to derive a noninterfering RF channel that will be used by main system.

6. Means for applying essentially identical formula at both link ends of main system to derive common RF channel plan (hop sequences).

7. Means of communicating interfere specific information between both link ends of main system to provide common input (seed) for essentially same formula that will be used to derive non interfere RF channel, which will be used by main system.

Figure 15:
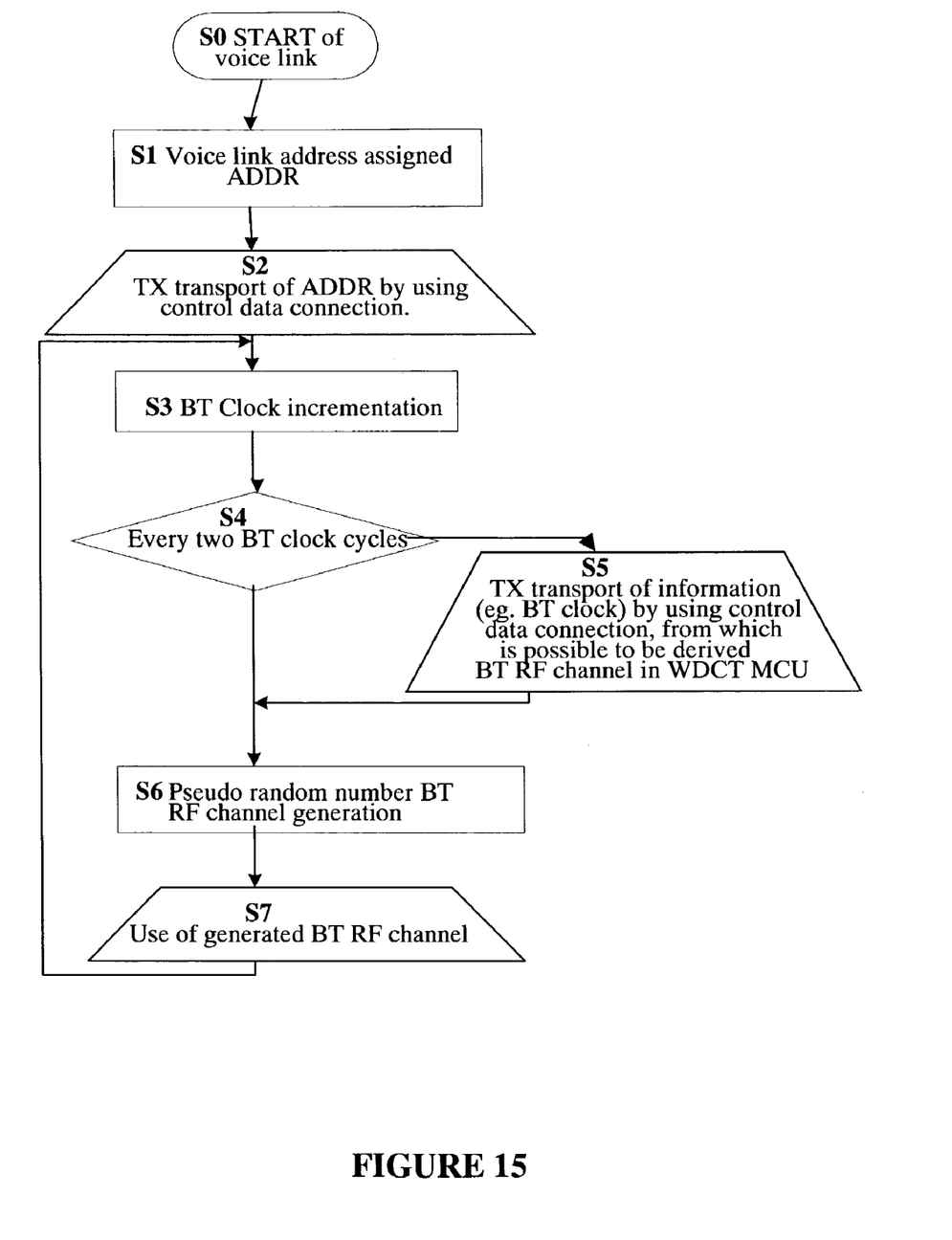
FIG. 15 is a flowchart showing exemplary steps that can be used to generate an RF channel for a BT transceiver in a BT-enabled portable unit of a telephone system.
Figure 16:
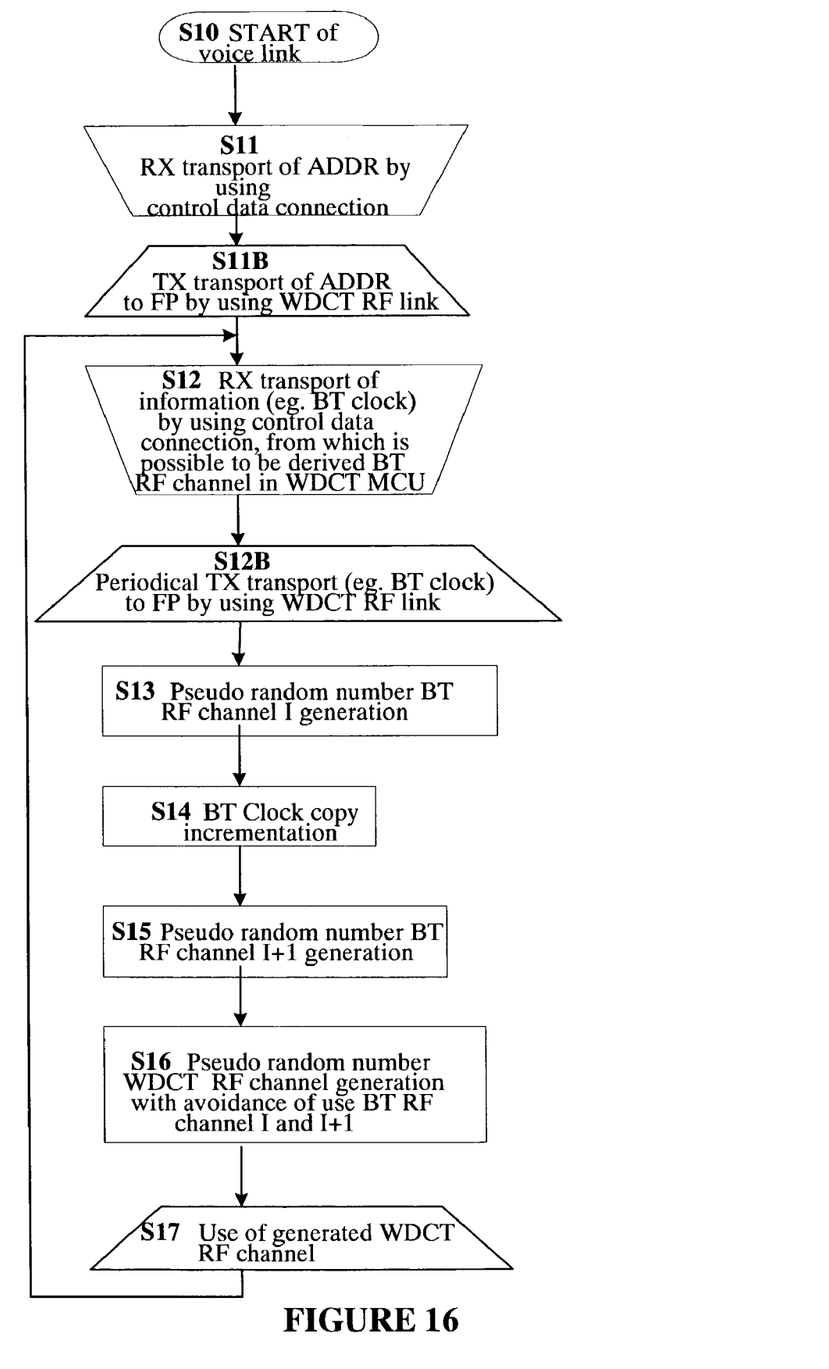
FIG. 16 is a flowchart showing exemplary steps that can be used to generate an RF channel for a WDCT transceiver in a BT-enabled portable unit of a telephone system.
Figure 17:
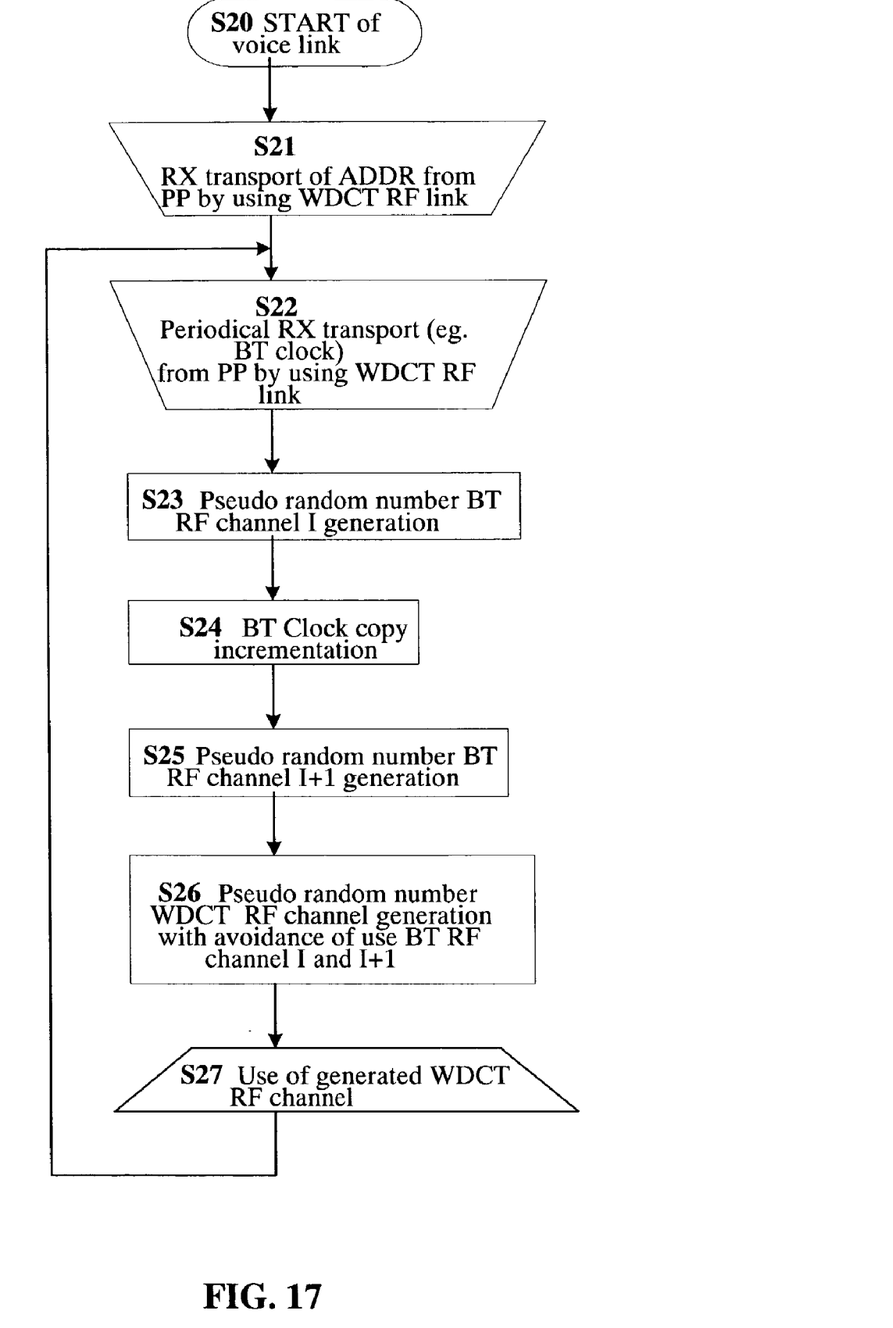
FIG. 17 is a flowchart showing exemplary steps that can be used to generate an RF channel for a WDCT transceiver in a fixed unit of a telephone system.

FIGS. 15, 16, and 17 are flowcharts showing exemplary steps that can be used to generate an RF channel in a cordless telephone system (e.g., cordless telephone 200) that includes a fixed unit (e.g., base unit 210), a portable unit (e.g., handset 220), and a headset unit (e.g., BT headset 230). FIG. 15 shows how an RF channel is generated in BT system 250 which is located within handset 220 (a BT-enabled portable unit). FIG. 16 shows how an RF channel can be generated for WDCT system 240, which is encapsulated in close proximity with BT system 250 in handset 220. FIG. 17 shows how an RF channel can be generated for WDCT system 270 located in base unit 210.

S0 shown in FIG. 15 and S10 shown in FIG. 16 indicate the start of a BT voice link between handset 220 (via BT system 250) and BT headset 230 (via BT system 260).

In S1, after the BT voice link is established between handset 220 and BT headset 230, the voice link address (ADDR) is assigned at BT system 250 as the voice link address for the duration of that voice link.

In S2, ADDR is sent or transmitted from BT system 250 to WDCT system 240. The transmission of ADDR is performed using control data connection 253. Note that ADDR is received at WDCT system 240 in S11 (see FIG. 16).

In S3, the BT clock (BT CLOCK) is incremented at BT system 250 once for each BT slot regardless whether the slot usage is for TX or RX.

In S4, a new BT clock information is generated for every two clock cycles. This is because for one voice connection there are two adjacent BT slots being used for the standard BT frame format known as DV-2.

In S5, the BT CLOCK is sent to WDCT system 240. The transmission of the BT CLOCK is performed using control data connection 253.

In S6, a pseudo random number RF channel is generated according to the BT standard. The RF channel is generated as a function of ADDR and BT CLOCK.

In S7, the generated RF channel is loaded in BT system 250.

S10 shown in FIG. 16 is same as S0 shown in FIG. 15, in which a BT voice link is established between handset 220 (via BT system 250) and BT headset 230 (via BT system 260).

In S11, WDCT system 240 receives ADDR that was transmitted in S2 from BT transceiver 252. Reception of the ADDR is performed via control data connection 253.

In S11B, WDCT system 240 transmits ADDR to WDCT system 270 of base unit 210. This transmission is performed using WDCT link 211.

In S12, WDCT system 240 receives BT CLOCK, which was sent by BT system 250 in S5. Reception of BT CLOCK is performed via control data connection 253.

In S12B, BT CLOCK is transmitted from WDCT system 240 to WDCT system 270 via WDCT link 211. Preferably, BT CLOCK is transmitted periodically.

S13, S14, S15, S16 shown in FIG. 16 correspond with S23, S24, S25, S26 shown in FIG. 17. In the preferred embodiment, where WDCT system 270 is the master, these steps are performed by WDCT system 270 (specifically WDCT processor 274), and the results are used by both WDCT systems 270 as well as WDCT system 240.

In an embodiment in which WDCT processor 244 is configured to perform S13, S14, S15, and S16, which are identical S23, S24, S25, and S26, as follows.

In S13, based on the received ADDR and BT CLOCK, a BT RF channel is generated by WDCT system 240. The BT RF channel i can be generated by using the same algorithm of S6.

In S14, a BT CLOCK copy is incremented.

In S15, the next BT RF channel i+1 is generated.

In S16, WDCT system 240 generates pseudo randomly one WDCT channel that avoids BT channels i and BT i+1. Algorithm for pseudo random generation in S16 can be totally different, similar to, or equal to one that is specified in BT standard.

In S17, the generated WDCT RF channel is used by WDCT system 240 to communicate with WDCT system 270.

To maintain WDCT link 211 of the voice link between handset 220 and base unit 210, frequency-hopping sequences are required to be synchronized on WDCT link ends, both handset 220 and base unit 210. Normally, WDCT link 211 is established between base unit 210 and handset 220 by using some frequency hopping sequence that may not be the same as frequency hopping sequence used for BT link 221. After BT link 221 is established, as previously described, sufficient information is supplied to WDCT transceiver 242 in handset 220 to generate a new RF channel plan. In this particular case, because of the nature of the BT frequency hopping algorithm, these RF channels are generated in real time. Same channel plan is required to be derived at base unit 210 link side.

Sometime about the beginning of the BT link, handset 220, in S11B and S12B, sends ADDR and BT CLOCK, respectively, to base unit 210 over WDCT link 211. As described further below, based on the received ADDR and BT CLOCK in S21 and S22 of FIG. 17, respectively, base unit 210 derives new RF channel plan that avoids BT channels i and i+1. Both WDCT link ends start to use RF channels according to new channel plan scheme (real time generation of new channels with avoidance of BT channels). It is important to notice that BT CLOCK information will only be send periodically between handset 220 and base unit 210 by using WDCT link 211. How often BT CLOCK is sent to base unit 210 depends on clock drifting between BT and WDCT frames in each of the BT-enabled portable unit, the regular portable unit, and the fixed unit.

FIG. 17 is a flowchart showing exemplary steps that can be used to generate an RF channel for WDCT system 270 in base unit 210. S20 indicates the start of voice link between base unit 210 and handset 220.

In S21, after the start of voice link, in order to generate one new WDCT RF channel, WDCT system 270 receives ADDR information from WDCT system 240, as described above in S11B.

In S22, WDCT system 270 receives BT CLOCK from WDCT system 240, as described above in S12B.

In S23, based on the received ADDR and BT CLOCK, a BT RF channel is generated by WDCT system 270. The BT RF channel i can be generated by using the same algorithm of S6.

In S24, a BT CLOCK copy is incremented.

In S25, the next BT RF channel i+1 is generated.

In S26, WDCT system 270 generates pseudo randomly one WDCT channel that avoids BT channels i and BT i+1. Algorithm for pseudo random generation in S26 can be totally different, similar to, or equal to one that is specified in BT standard.

In S27, the generated WDCT RF channel is used by WDCT system 270 to communicate with WDCT system 240.

In preferred embodiments of the invention, it is most convenient that a majority of the steps shown in FIG. 15 be implemented in software that is executed by BT processor 254. Similarly, a majority of the steps shown in FIG. 16 should be implemented in software that is executed by WDCT processor 244. Similarly, steps shown in FIG. 17 should be executed in software associated with WDCT processor 274. However, in other embodiments, some steps may be completely or partially executed in dedicated hardware rather than on processor units. For example, S4 shown in FIG. 15, the pseudo random number based BT RF channel generation can be usually implemented in hardware.

It is noted that the processes described in FIGS. 15, 16, and 17 are directed to implementing preferred embodiments of the invention. It is specifically noted that other embodiments of the invention do not necessary follow the processes described. The common idea of the alternative embodiments is that at some point of time there is a need to calculate two BT RF channels that will be used. Both BT RF channels are required to be generated prior to their usage. Based on those two channels, a third RF channel is set up for the WDCT system. Strictly speaking, it is not required to be generated two BT RF channels completely prior to WDCT RF channel generation. It is enough to be generated two numbers that are related with two BT RF channels. And those numbers are used as an input to the calculation in S16 that will generate one WDCT RF channel.

For example, in one alternative embodiment the majority of two processes described in FIG. 15 and FIG. 16 can be combined together in one. The combined processes can be executed by BT processor 254 in the BT enabled handset 220. BT processor 254 can derive new WDCT channel and supply this information to the WDCT processor 244 by using control data connection 253. In another embodiment, WDCT processor 244 in handset 220 may receive BT CLOCK only periodically instead of every two BT clock cycles as stated in S4. WDCT processor 244 of handset 220 keeps its own copy of the BT clock. BT clock copy update rate will depend on estimated drifts between BT and WDCT processors in BT enabled handset 220.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a fixed unit having a fixed transceiver;
a portable unit having a first portable transceiver, wherein the first portable transceiver is configured to communicate using a first FH-TDMA system with the fixed transceiver via a first RF link in a first frequency range;
a second portable transceiver different from the first portable transceiver and arranged in the portable unit, wherein the second portable transceiver is configured to communicate using a second FH-TDMA system with a headset via a second RF link in a second frequency range similar to the first frequency range; and
a processor coupled to one or more of the fixed transceiver, the first portable transceiver, and the second portable transceiver, wherein the processor is configured to avoid interference between the first RF link and the second RF link by generating an RF channel for the first RF link that supports communications during a first timeslot, and by generating a first and second RF channel associated with the second link, wherein each of the first and second RF channels supports communications during the first timeslot, wherein the RF channel for the first RF link is different from the first and second RF channels associated with the second RF link.

2. The system of claim 1, wherein the fixed unit is configured to communicate with a telephone network and the fixed unit and the portable unit are a base unit and a cordless handset of a cordless telephone, respectively.

3. The system of claim 1, wherein each of the fixed transceiver and the first portable transceiver is a cordless telephone transceiver.

4. The system of claim 3, wherein the first cordless telephone transceiver is a WDCT transceiver.

5. The system of claim 1, wherein the headset is a Bluetooth headset and the additional transceiver is a Bluetooth transceiver.

6. The system of claim 1, wherein the processor generates the RF channels based on frequency information associated with the second FE link.

7. The system of claim 6, wherein the frequency information includes Bluetooth clock and Bluetooth connection address.

8. The system of claim 6, wherein the frequency information is provided to the processor via a control data connection.

9. A handset of a cordless telephone comprising:
a first portable transceiver, wherein the first portable transceiver is configured to communicate using a first FH-TDMA system with a fixed transceiver of a fixed unit of the cordless telephone via a first RF link in a first frequency range;
a first processor coupled to the first portable transceiver; and
a second portable transceiver coupled to the first processor, wherein the second portable transceiver is configured to communicate using a second FH-TDMA system with a headset transceiver of a headset via a second RF link in a second frequency range similar to the first frequency range, wherein the first RF link and the second RF link are associated with two different RF systems,
wherein the first processor is configured to receive frequency information associated with the second RF link to generate an RF channel for the first RF link that supports communications during a first timeslot, and to generate a first and second RF channel of the second link, wherein each of the first and second RF channels supports communications during the first timeslot, wherein the RF channel for the first RF link does not interfere with the first and second RF channels of the second RF link.

10. The handset of claim 9, further comprising a second processor coupled to the second portable transceiver, wherein the second processor is configured to supply the frequency information to the first processor using a control data connection between the second processor and the first processor.

11. The handset of claim 9, wherein the frequency information includes Bluetooth clock and Bluetooth connection address.

12. A wireless communication system, comprising:
a cordless telephone base station having a first transceiver;
a cordless handset having a second transceiver configured to communicate using a first FH-TDMA system with the first transceiver over a first RF link in a first frequency range and a third transceiver configured to communicate using a second FH-TDMA system with a headset over a second RF link in a second frequency range similar to the first frequency range and
a processor set coupled to one or more of the first, second, and third transceivers, wherein the processor set is configured to avoid interference between the first RF link and the second RF link by generating an RF channel for the first RF link that supports communications during a first timeslot, and by generating a first and second RF channel associated with the second link, wherein each of the first and second RF channels supports communications during the first timeslot, wherein the RF channel for the first RF link is different from the first and second RF channels associated with the second RF link.

13. The wireless communications system of claim 12, wherein the base station is configured to communicate with a telephone network over a wired link.

14. The wireless communications system of claim 12, wherein the second transceiver is a WDCT transceiver.

15. The wireless communications system of claim 12, wherein the headset is a Bluetooth headset and the third transceiver is a Bluetooth transceiver.

16. The wireless communications system of claim 12, wherein the processor set is configured to generate RF channels based on frequency information associated with the second RF link.

17. The wireless communications system of claim 16, wherein the frequency information includes Bluetooth clock and Bluetooth connection address.

18. The wireless communications system of claim 12, wherein the processor set includes first, second, and third processors coupled to the respective first, second, and third transceivers.

19. The wireless communications system of claim 18, further comprising a control data connection configured to transmit the frequency information between the second and third processors.

20. The wireless communications system of claim 12, wherein the first RF link is a WDCT RF link.

21. The wireless communications system of claim 12, wherein the second RF link is a Bluetooth RF link.

22. The wireless communications system of claim 12, further comprising one or more additional handsets each including a base transceiver configured to communicate over the first RF link and a headset transceiver configured to communicate with a headset over an additional RF link.

* * * * *